US005915278A

United States Patent [19]

Mallick

[11] Patent Number: 5,915,278

[45] Date of Patent: *Jun. 22, 1999

[54] SYSTEM FOR THE MEASUREMENT OF ROTATION AND TRANSLATION FOR MODAL ANALYSIS

[76] Inventor: Brian C. Mallick, 15506 Ripplewind La., Houston, Tex. 77068

[ * ] Notice: This patent issued on a continued prosecution application filed under 37 CFR 1.53(d), and is subject to the twenty year patent term provisions of 35 U.S.C. 154(a)(2).

[21] Appl. No.: 08/394,475

[22] Filed: Feb. 27, 1995

[51] Int. Cl.[6] ................................ G01H 9/00; H01Q 1/38

[52] U.S. Cl. ..................... 73/658; 343/753; 343/700 MS

[58] Field of Search ............................ 73/579, 654, 658; 343/700 MS, 753, 853; 455/67.1

[56] References Cited

U.S. PATENT DOCUMENTS

| | | | |
|---|---|---|---|
| 4,061,017 | 12/1977 | Sloane et al. . | |
| 4,318,103 | 3/1982 | Roettele et al. | 343/753 |
| 4,481,825 | 11/1984 | Kljuev et al. | 73/658 |
| 4,526,465 | 7/1985 | Corti et al. . | |
| 4,601,580 | 7/1986 | Halliwell . | |
| 4,689,993 | 9/1987 | Slettemoen . | |
| 4,823,137 | 4/1989 | Mallick | 342/457 |
| 4,926,691 | 5/1990 | Franklin et al. . | |
| 4,996,878 | 3/1991 | Kübler . | |
| 5,471,220 | 11/1995 | Hammers et al. | 343/700 MS |
| 5,485,164 | 1/1996 | Compton et al. | 343/700 MS |

OTHER PUBLICATIONS

D. J. Ewins, "Modal Testing: Theory and Practice", 1989, John Wiley and Sons, pp. 1–89, 146–149.

E. J. Breitbach, Recent Developments in Multiple Input Modal Analysis Transactions of the ASME—Journal of Vibration, Acoustics, Stress, and Reliability in Design, Oct., 1988, V. 110, pp. 478–484.

L. A. Christel, M. Bernstein, R. Craddock, and K. Petersen, "Vibration Rectification in Silicon Micromachined Accelerometers", Transducers '91 Digest of Technical Papers, 1991, pp. 89–92.

*Primary Examiner*—Hezron Williams
*Assistant Examiner*—Helen C. Kwok
*Attorney, Agent, or Firm*—Arnold, White & Durkee

[57] ABSTRACT

A system for making modal analysis is disclosed which uses multiple frequencies for calculating the bearing and distance of a sensor from a remote receiver component. The sensor's adaptor to be secured to a structure-under-test. Microwave oscillators are formed on the substrate. Each oscillator has a separate microstrip antenna coupled to its output. At least one of these antennas has a separate dielectric lens to shape its microwave signal to have a different beam shape than the microwave signals transmitted by the other antennas. A remote receiver component is positioned in a line of sight relation with the sensor and includes a base and a separate receiver for each antenna. A stored program processor measures lapsed time between receipt of a query signal and receipt of a signal reception indication and calculates the distance between the sensor and the remote receiver component. A piezoresistive accelerometer generates an acceleration signal that can be used by a stored program processor to calculate displacement of the sensor normal to the plane of the sensor and the antennas. The stored program processor also compares the relative signal strengths to the signals received by the remote receiver component from the various antennas of the sensor and, using this data, calculates the bearing of the remote receiver component from the sensor.

11 Claims, 6 Drawing Sheets

SYSTEM FOR THE MEASUREMENT OF ROTATION AND TRANSLATION FOR MODAL ANALYSIS

BACKGROUND OF THE INVENTION

1. Field of the Invention

The present invention broadly pertains to systems for testing physical structures using modal analysis. The invention more particularly concerns a system for ascertaining the dynamic or vibrational behavior of a structure by means of directional microwave signals which emanate from the structure in a variable manner, representing forces applied to the structure. Oscillators located on a sensor mounted on the structure generate the signals which have separate frequencies and generally common directions. Movements of the oscillators cause movements of the signals which are detected by remote receivers positioned in line of sight relation with the structure-under-test.

2. Related Art

Modal analysis in general terms is a system of testing structures to obtain a mathematical description of their dynamic or vibrational behavior. A structure undergoing such an analysis is referred to herein as a structure-under-test. A resulting mathematical description will typically include such behavioral data as the structure's natural frequencies (the frequencies when no external force is applied), damping factors, and mode shapes (relative deformations as a function of frequency). These data are typically represented as matrices which are, in turn, expressed as eigenvectors and eigenvalues.

Complex algebra (with real and imaginary components) is commonly used to describe both magnitude and phase information of a structure-under-test. More specifically, an imaginary number represents a value in a plane that is perpendicular to the plane in which a measurement is being taken. Thus, in modal testing, imaginary numbers represent measurements of an out-of-plane component of a vibration. This measurement of various vibration modes by modal testing is used to compare measured data with corresponding data produced by a theoretical model. Commonly, the theoretical model used is a finite element model.

Presently, in modal analysis, engineers attach accelerometers to several points along a structure-under-test. The structure-under-test is then subjected to a known force or vibration. The accelerometers generate responses to the force or vibration. These responses are recorded. In many experiments, mobility is the parameter of interest. Mobility is calculated by dividing velocity by the force applied to the structure-under-test. To determine mobility, the accelerometers are connected to electronic integrators which convert measured acceleration into velocities. These integrators are resistive-capacitive circuits which act as low-pass filters. Using a Fast Fourier Transform to obtain frequency response functions, measured data in a time domain are converted into data in a frequency domain.

Once frequency response data are recorded, natural frequencies, mode shape matrices, and damping factors can be derived mathematically. One of the most common methods for effecting such mathematical derivations is the circle-fit method. This method uses Nyquist circle plots of frequency response data. A Nyquist circle is a plot of real and imaginary components of frequency response data—these real and imaginary components tend to form a circle. The circle-fit method works because, in the vicinity of most systems' resonance, vibrational behavior is dominated by a single mode. By measuring the maximum rate of change of the frequencies along the circle, the natural frequency and damping factors may be found. The amount of error for such a natural frequency measurement is typically plus or minus 10%. The Nyquist plot uses the data obtained by the accelerometers from a structure that was subjected to a known force. The circle-fit method then allows determination of the structure's natural frequency and damping factors. Once natural frequency and damping factors are known, the modal constant and a mode shape matrix may be derived.

Almost all modal analysis has required use of piezoelectric or piezoresistive accelerometers. As is well-known, accelerometers measure dynamic responses. However, piezoelectric and piezoresistive accelerometers for modal analysis have certain limitations. For example, accelerometers can only measure linear acceleration in one direction. To measure acceleration in three directions, three mutually perpendicular accelerometers are bound together. Each individual signal is then matched in time and phase to deduce true three-dimensional movement of the structure-under-test. The imaginary component (the complex mode) for each accelerometer is then mathematically transformed into real normal modes by a known matrix manipulation technique. The higher the frequency of the vibration being measured, the more difficult it is to match all three signals. Moreover, a single piezoelectric or piezoresistive accelerometer cannot directly measure rotation in more than one plane. Accordingly, rotation has been deduced by comparing the signals of two or more closely spaced accelerometers on a structure-under-test. Additionally, some accelerometers currently in use have limited dynamic ranges. Thus, structures subjected to a wide range of forces may require one set of accelerometers to measure low accelerations, such as 5 g's, as well as a second set of accelerometers to measure high accelerations, such as 100 g's. Further, most piezoelectric and piezoresistive devices cannot measure true static conditions; they can only reliably measure changes in acceleration. Only variable capacitance accelerometers such as Endevco's Microtron can measure low-level accelerations in a steady-state or low-frequency environment.

The physical chemistry, design, and construction of piezoelectric and piezoresistive accelerometers have also resulted in certain limitations; namely, limitations in the accuracy of signals produced by the devices. More specifically, piezoelectric crystals subjected to large dynamic forces may produce electrical outputs sufficient to temporarily or even permanently reduce the sensitivity of the crystals. Signals from piezoelectric crystals may also be affected by drift and a circuit's time constant, thereby producing an undesirable change in output signal over time which is not a function of the measured variable. Typically an amplified signal may either drift towards a saturation level defined by the power supply, or it may decay towards zero at the time constant rate.

Piezoresistive systems are also affected by vibration rectification, that is, that a DC output of such an accelerometer changes as a function of vibration level. This means that when vibrations are being measured, an anomalous DC offset may occur. The main reason for vibration rectification is a simple DC scaling nonlinearity of the basic accelerometer response, although asymmetric damping of an accelerometer's seismic mass may also be a contributing factor.

It is also known that both piezoresistive and piezoelectric devices must be constructed carefully so that no built-in stresses are present which can affect the performance of an instrument in which the accelerometer is contained.

Most known related art systems use piezoelectric or piezoresistive devices. Accordingly, most related art systems can only measure acceleration normal to the plane on which the devices are attached, and they cannot directly measure rotation. Most known systems measure rotational response by recording the outputs of at least two closely spaced accelerometers, and then computing the mean and difference of their outputs. Unfortunately, with these systems, measurement of rotational frequency response functions commonly requires acquisition and processing of several different measurements. Some rotational accelerometers and shakers have been specially developed, but these produce poor results because prevailing levels of output signals generated by translational components of a structure's movement tend to overshadow any output signals due to rotational motions.

A piezoelectric and piezoresistive transducer element has been described in the art which employs a pair of electromechanically reacting, oscillating beams affixed to a main axis which is attached to a base plate. This device is stated to measure angular acceleration parallel to the surface on which it is affixed as well as linear acceleration normal to that surface. This device, however, can only measure linear acceleration in one direction and angular acceleration in another direction; consequently, three of these devices must be attached in mutually perpendicular directions in order to measure true three-dimensional movement.

Another suggested device utilizes laser beam interferometers for detecting displacements of points of an excited structure. Once again, a plurality of these devices is necessary to determine three-dimensional movements of the structure. If the structure is vibrating rapidly, the point that is being measured by the interferometers can change with the structure's vibration—i.e., the structure's vibrations can prevent the laser beams from remaining focused on a single point.

Still another suggested device uses Doppler signals from two parallel laser beams to measure rotational velocity of a body and, hence, the rotational vibration or vibrations of that body in the same direction as the laser beams.

SUMMARY OF THE INVENTION

The present invention addresses the above-noted and other drawbacks of the known related art by utilizing radio waves to measure three-dimensional motion. A system according to the present invention features the ability to measure three-dimensional motion with greater dynamic range than current accelerometers and to help avoid deleterious mechanical effects. Measurement of rotational responses by recording output signals of multiple accelerometers and then computing the mean and difference of the responses is an undesirable requirement of existing systems that the present invention addresses.

The present invention in a broad aspect comprises a system for making modal analyses, wherein a structure-under-test is provided with a sensor which is mounted on the structure. At least three directional microwave oscillators are located on the sensor in a common plane with individual directional antennas such that the signals emanating from the antennas travel in a generally common direction from the antennas. Each oscillator generates a signal having a frequency different from the signals generated by the other oscillators. In a preferred form, one or more of the antennas are provided with dielectric lenses to help shape and direct the signals beamed by the antennas. Each dielectric lens is attached to its corresponding antenna at an attachment post.

A piezoresistive accelerometer is also located on the sensor, preferably in a central position relative to the antennas. The purpose of this accelerometer is to improve detection of sensor movements in a direction normal to the plane of the sensor and the antennas. Signals generated by the accelerometer in response to the sensor movements are transmitted via a signal output line and can then be processed to calculate displacement of the sensor normal to the plane of the sensor and the antennas. A programmed computer or one or more microprocessors are provided for this purpose.

The microwave signals are directed at a remote receiver component which comprises a separate receiver for each signal. The receiver component further comprises at least one signal transmitter capable of energizing one or more of the oscillators on the structure-under-test. The transmitter, in effect, queries the oscillators to obtain microwave signals which can then be processed to subject the structure-under-test to modal analysis. A programmed computer or one or more microprocessors are provided for this purpose.

The invention in a preferred embodiment is capable of providing the following: a) three dimensional modal analysis of a structure-under-test; b) measurement of rotation of the structure-under-test; c) greater dynamic range; d) lower signal deterioration; and e) direct mode shape measurement. More specifically, the present invention enables measurement of true displacement (and hence true velocity and acceleration) in three dimensions. Because the present invention measures signals in all planes, no signal merging and processing of imaginary (out-of-plane) components of acceleration from current piezoelectric and piezoresistive accelerometers are required. Hence, accuracy of measurements is improved, and the time needed to obtain modal properties is decreased.

As noted above, the present invention enables measurement of motion including, for example, three-dimensional displacement, rotation, velocity, and acceleration, something that typical piezoelectric and piezoresistive accelerometers cannot directly measure. Additionally, the present invention provides a wider measuring dynamic range than most conventional piezoelectric and piezoresistive accelerometers. For example, the present invention can measure a range from no movement to a high frequency vibration as high as approximately one-tenth the speed of an associated computer's microprocessor. More particularly, using a controlling microprocessor with a speed of 20 MHz, the present invention can measure frequencies up to about 0.5 to 2.5 MHz.

The present invention enables displacement to be measured by the change in angle of a received radio signal and, thus, does not suffer from signal deterioration from mechanical effects. As an example of such deterioration, asymmetric damping of a seismic load in piezoresistive devices can contribute to vibration rectification effect. Piezoelectric crystals are also subject to signal drift, and large dynamic forces may reduce a crystal's sensitivity. The present invention is not affected by these forces. Additionally, the present invention provides direct measurement of true three-dimensional mode shape matrices in real time. Current modal analytic methods would have to incorporate the signals from a minimum of three accelerometers at any given location and also process out-of-plane data in order to do the same.

A device according to the present invention may be referred to as a Radio Displacement Measuring Device (RDMD) and may be fabricated on one or two microchips using Monolithic Microwave Integrated Circuit (MMIC) technology.

According to a preferred embodiment of the invention, the invention comprises the use of motion sensors, each of which comprises a minimum of three transmitters, with each transmitter having an oscillator, antenna, and associated circuitry, with different frequencies and different beam shapes. The three transmitters are monolithically placed in spaced relation on a sensor, whose size (including the microstrip antennas and a separate piezoresistive accelerometer) is preferably smaller than a credit card and approximately 4 or 5 credit card thicknesses thick. This system is used by placing such a sensor of the invention on the structure-under-test. The sensor emits pulsed or continuous unmodulated directional microwave signals. A piezoresistive accelerometer, such as mentioned above, also emits a signal.

In the line of sight of the sensor is a remote receiver component capable of separately detecting each transmitted signal; the remote receiver component may also be constructed using MMIC technology. The remote receiver component only has to measure the power of each transmitted frequency and does not have to demodulate the signals; therefore, the receiver electronics may be very simple and may be made very small. Each receiver of the remote receiver component generates a separate voltage for one of the transmitted frequencies that is a function of the received signal strength for that frequency. The remote receiver component is attached or connected to a computer that can read the voltage from each receiver. Thus, a stored-program-processor in the computer preferably reads each voltage, stores that voltage strength number in memory as a function of time, and then calculates the bearing of the structure-under-test. This is done by calculating the signal strength ratios for each voltage and checking a library of predetermined signal strength ratios stored in the computer's memory. The speed of determining the bearing or angle data is a function of microprocessor speed and the number of microprocessors in the computer associated with the remote receiver component. The microprocessors read and store voltage signals from the remote receiver component one at a time. Following any given test, the computer performs modal analysis calculations from the recorded data obtained from the test. A parallel processing computer allows each frequency to be assigned to its own microprocessor. By using a plurality of microprocessors to simultaneously process the data received during a test, it is possible to alter or expand the test in mid-course if the measured and processed data meet predetermined limits. This allows for the testing of an expanded number of conditions, because the data do not have to be "digested" after each experimental force is applied to an experimental structure. A principal reason that this is possible is that the remote receiver component measures true three dimensional motion, not just motion in one plane (real motion and the components of out-of-plane motions) as measured by accelerometers.

DESCRIPTION OF THE PREFERRED EMBODIMENT

Figure 1:
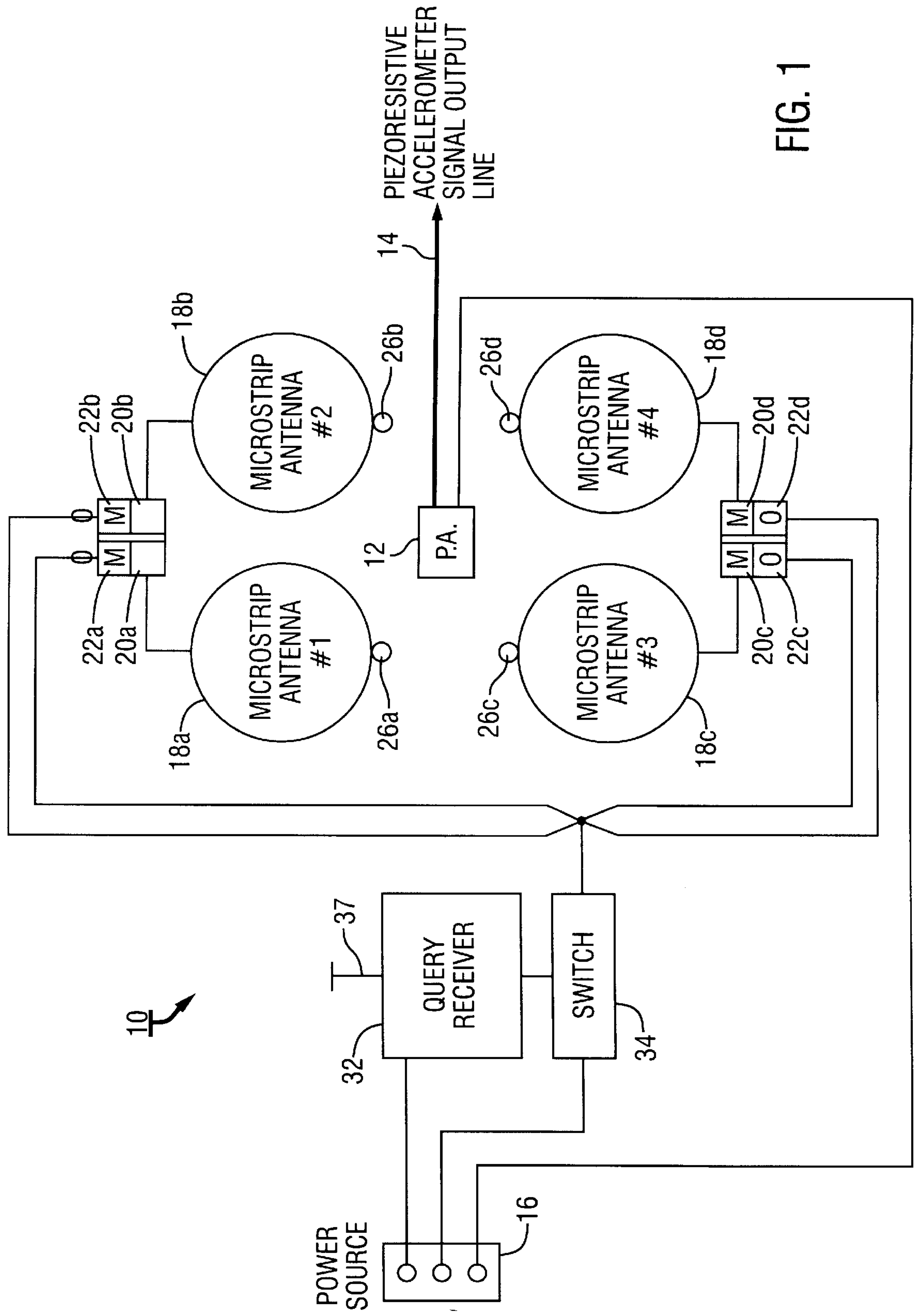
FIG. 1 is a block diagram of a sensor of a modal analysis system according to the present invention.

Referring now to the drawings, and in particular to FIG. 1, a sensor 10 according to the present invention is depicted in block diagram form. A power source 16 is conductively coupled to a query receiver 32, a switch 34 and a central accelerometer 12. Switch 34 is conductively coupled to four transmitting circuits each including an antenna 18*a*–18*d*, a matching circuit 20*a*–20*d*, an oscillator 22*a*–22*d*, and an attachment post 26*a*–26*d*. Switch 34 is also conductively coupled to the query receiver 32. Central accelerometer 12 is conductively coupled to a stored program processor (shown in FIG. 2) via an accelerometer signal output line 14.

Antennas 18*a*–18*d* are microstrip antennas and are printed on a supporting substrate using well-known chemical deposition and etching methods. Such a substrate may be made of alumina, quartz or styrene copolymer. For example, the antenna may be cured onto a substrate that overlies a metallic ground plane and then bound to the metallic ground plane by a known chemical or mechanical means. Fabrication of a microstrip antenna is discussed in "Resonant Microstrip Antenna Elements and Arrays for Aerospace Applications" by A. G. Derneryd, in *Handbook of Microwave and Optical Components*, edited by J. R. James and P.S. Hall (1989) at page 1075. The size of each antenna 18 is a function of several factors including signal wavelength, microwave propagation mode, substrate thickness, and substrate permittivity. For example, for frequencies of 2 to 12 GHz, each antenna 18 may have a diameter of approximately 5 to 20 mm. Each antenna 18 may be flat or inclined. Preferably, if inclined, the antenna is inclined 15 degrees towards the center point of the sensor 10.

In a preferred embodiment, antennas 18*a*–18*d* are each covered with individual dielectric lenses. Preferably, each lens is affixed to its corresponding antenna's attachment post via some well-known method or substance such as glue. For example, the dielectric lens corresponding to antenna 18*b* may be glued to attachment post 26*b*. Additionally, each dielectric lens is preferably a symmetric concave circular plastic dielectric lens having the same diameter as its corresponding antenna.

The central accelerometer 12 is a piezoresistive accelerometer preferably mounted in a central position relative to the antennas 18*a*–18*d*.

The oscillators 22*a*–22*d* may be fabricated of high electron mobility transistors (HEMT's). The sensor may contain an oscillator for the frequency of each antenna.

The matching circuits 20*a*–20*d* provide efficient transfer of microwave signals from the oscillators 22*a*–22*d* to microstrip antennas 18*a*–18*d* usually by matching impedances.

Query receiver 32 may be a conventional device such as a receiver commonly used in circuitry for radio-controlled car alarms or garage door openers. The query receiver 32 is conductively coupled to omni-directional dipole antenna 37.

Figure 2:
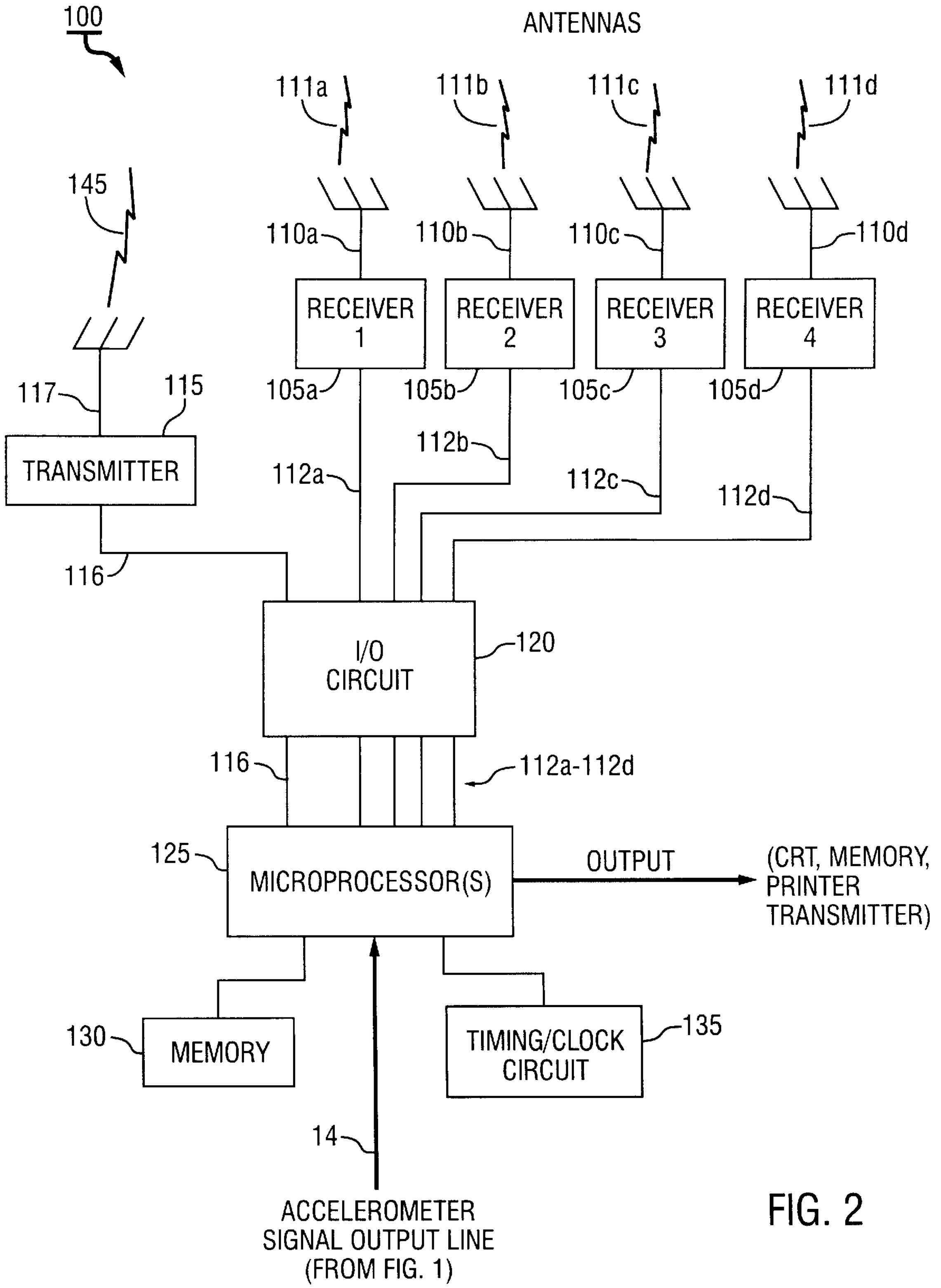
FIG. 2 is a block diagram illustrating a remote receiver component of a modal analysis system according to the present invention.

Referring now to FIG. 2, remote receiver component 100 according to the present invention is depicted in block diagram form. A query transmitter 115 and four receivers 105*a*–105*d* are conductively coupled to a coordinating (input/output) circuit 120. The coordinating circuit 120 is conductively coupled to a stored program processor (microprocessor) 125. The stored program processor 125 is also conductively coupled to a memory 130 and a timing and clock circuit 135.

In use, sensor 10 is attached to a structure-under-test. More specifically, sensor 10 is attached to a structure-under-test at a point within the line of sight of the remote receiver component 100 such that any emitted signals are not blocked.

In operation, the query transmitter 115 transmits one or more query signals 145 to the sensor 10. The query receiver

32 of the sensor 10 receives one or more of the query signals 145 at the omni-directional dipole antenna 37. In response to each of the query signals 145 received, the query receiver 32 sends one or more trigger pulses to the switch 34. In response, the switch 34 closes and thereby energizes the transmitting circuits. Once energized, antennas 18*a*–18*d* of the transmitting circuits simultaneously broadcast microwave signals 111*a*–111*d*, respectively, each microwave signal being broadcast at a different frequency.

At the same time that the query signal 145 is transmitted, a query transmission indication signal 116 is sent from the query transmitter 115 through the coordinating circuit 120 to the stored-program processor 125 and the timing circuit 135. In response to the query transmission indication signal 116, the stored program processor 125 and the timing circuit 135 measure the time for the remote receiver component 100 to receive the response signal 111*d* from the microstrip antenna 18*d*.

Each receiver 105*a*–105*d* receives its respective microwave signal 111*a*–111*d* via its respective antenna 110*a*–110*d*. In response, each receiver 105*a*–105*d* generates a signal strength indication signal 112*a*–112*d* and transmits each signal strength indication signal 112*a*–112*d* to the coordinating circuit 120, which, in turn, transmits the signal strength indication signals 112*a*–112*d* to the stored-program processor 125.

The receiver 105*d*, in response to its microwave signal 111*d* received via its antenna 110*d*, transmits a signal reception indication 112*d* through the coordinating circuit 120 to the stored-program processor 125. As soon as the processor 125 receives the signal reception indication 112*d* from the receiver 105*d* corresponding to the microstrip antenna 18*d*, the processor 125 calculates the elapsed time between receipt of the transmission indication signal 116 and receipt of the signal reception indication 112*d*. The stored-program processor 125 has stored in it the speed of radio waves in the earth's atmosphere. Using this data, stored program processor 125 calculates the distance between the remote receiver component 100 and the sensor 10.

In operation, the stored-program processor 125 compares the signal strength indication signals 112*a*–112*d* and computes the angle between the remote receiver component 100 and the sensor 10. The antennas 18*a*–18*d* each beam a symmetrical signal whose beam width varies with the thickness of the dielectric lenses. In the present embodiment, antenna 18*a* has a thin, flat dielectric circular lens attached at attachment post 26*a*. Additionally, antenna 18*a* transmits a signal whose cross section f in any direction through the antenna's longitudinal axis closely approximates the function:

$$f=e^{-y} \qquad \text{Equation 1}$$

where:

$$y=bx^2/2; \qquad \text{Equation 2}$$

and where:

x=angle in radians away from the centerline of the angle at which the antenna is facing; and b=beam width constant.

In the present embodiment, b is equal to 1.37 giving a beam width of 87.8 degrees. Thus, 87.8 degrees away from the centerline of the angle at which the antenna is facing, the power of the transmitted signal is 0.2 of the power along the centerline of the angle at which the antenna is facing. If, for example, a beam width of 80 degrees is desired for a different embodiment, then b must be chosen to be 2.31.

Also, in the present embodiment, microstrip antenna 18*c* has a thick concave dielectric lens attached at attachment post 26*c*. This lens shapes the antenna's signal such that antenna 18*c* beams a symmetrical directional signal whose cross section in any direction through the antenna's longitudinal axis closely approximates the function:

$$f=e^{-dx} \qquad \text{Equation 3}$$

where:

x=angle in radians away from the centerline of the angle at which the antenna is facing; and d=beam width constant.

In the present embodiment, d is equal to 1.5 giving a beam width of 61.47 degrees. Thus, 61.47 degrees away from the centerline of the angle at which the antenna is facing, the power of the transmitted beam is 0.2 of the power along the centerline of the angle at which the antenna is facing.

In the present embodiment, microstrip antennas 18*b* and 18*d* are each covered by individual concave dielectric lenses attached at each antenna's attachment post 26*b* and 26*d*. Each of these concave dielectric lenses is thinner than the lens covering antenna 18*c*. Each lens shapes its corresponding antenna's signal such that each antenna beams a symmetrical directional signal whose cross section in any direction through its corresponding antenna's longitudinal axis closely approximates the function:

$$f=e^{-wx} \qquad \text{Equation 4}$$

where:

x=angle in radians away from the centerline of the angle at which the antenna is facing; and w=beam width constant.

In the present embodiment, w is equal to 1.2 giving a beam width of 76.84 degrees. Thus, 76.84 degrees away from the centerline of the angle at which the antenna is facing, the power of the transmitted beam is 0.2 of the power along the centerline of the angle at which the antenna is facing.

In accordance with the present invention, the signal strength received at the remote receiver component $P_R$ varies with angle relative to the maximum signal strength transmitted $P_M$ along each antenna's centerline. For example, when the sensor 10 is not inclined relative to the component 100, each antenna 18*a*–18*d* broadcasts a signal 111*a*–111*d*, each signal being broadcast at the same power. Each receiver 105*a*–105*d* receives its corresponding microwave signal 111*a*–111*d* via its respective antenna 110*a*–111*d* and, in response, generates a signal strength indication signal 112*a*–112*d*. Since each signal's strength is determined by measuring signal strength along each signal's centerline and, in this case, each signal is broadcast at equal power, all signal strength indication signals 112*a*–112*d* have the same value. If, on the other hand, the sensor 10 is tilted 10 degrees relative to the remote receiver component 100 along an axis which is parallel to a line connecting the centers of antennas 18*a* and 18*b*, the value of the signal strength indication signal generated by each receiver 105*a*–105*d* will differ for each frequency. Receiver 105*a* receives a signal 111*a* and, in response, transmits a signal strength indication signal having a value of 0.98, but receiver 105*b* receives a signal 111*b* and, in response, transmits a signal strength indication signal having a value of 0.77 the value received along the signal's centerline. The ratio of the signal strengths is a function of the angle of the sensor 10. In this instance, the ratio for the signal strengths is 0.79. However, because the signals overlap in space, the ratio of signal strengths is a non-unique solution that defines an arc of possible positions. Measuring signal strength for each of the other transmitted beams at the same 10 degree angle along an axis which is parallel to a line connecting the centers of microstrip antennas 18*a* and 18*b* produces a set of signal strength ratios that define other arcs of position. There is one common point in each arc that is a function of the angle of the sensor 10. The stored program processor 125 compares the set of calculated signal strength ratios to a predetermined library of signal strength ratios as a function of position to define this common point.

Figure 3A:
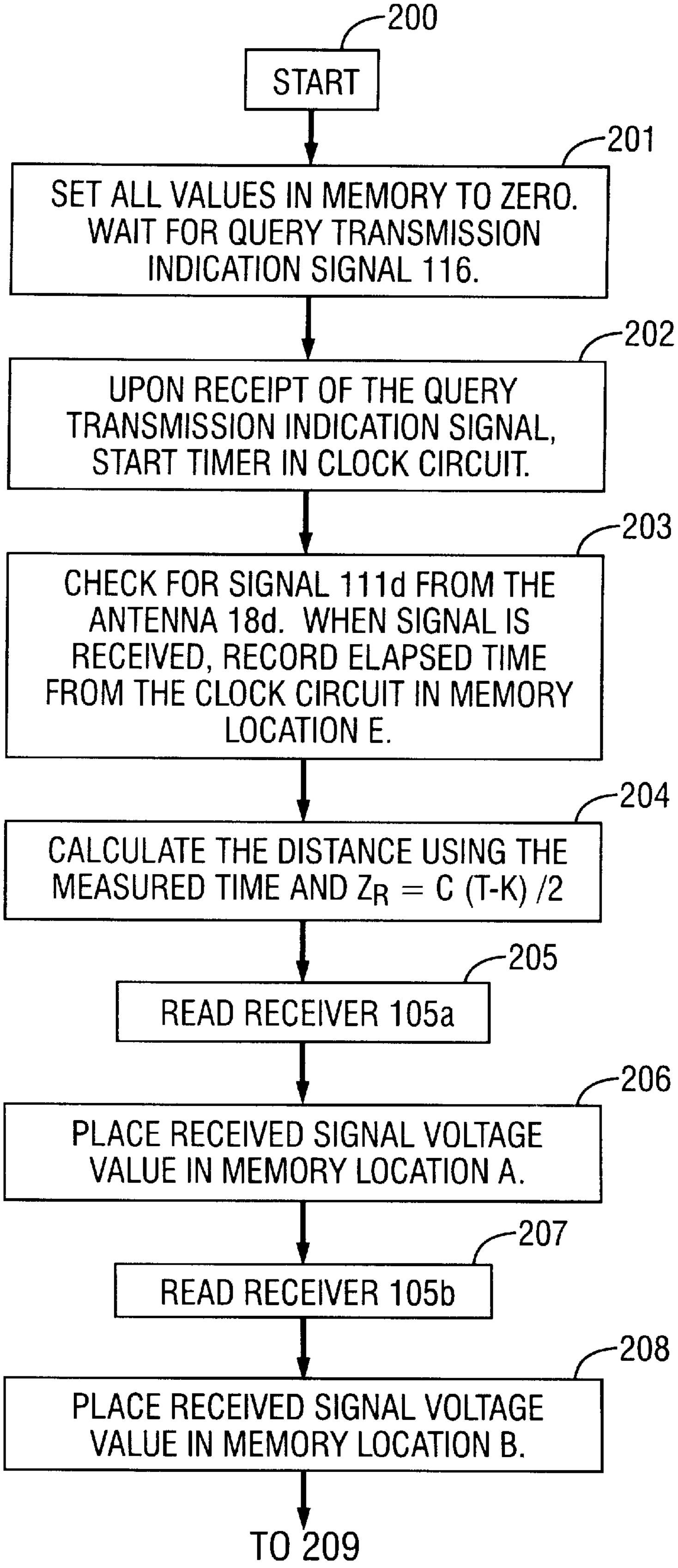
FIGS. 3A–3D depict in flowchart form the method used by stored program processor 125 to calculate the distance and bearing of the sensor from the remote receiver component.

Depicted in FIGS. 3A–3D in flowchart form is the method used by the stored program processor 125 to calculate the displacement and bearing of the remote receiver component 100 from the sensor 10. Referring now to FIG. 3A, and steps 200–209, the stored program processor 125 first sets all values in memory to zero, except for those values which are in the library of predetermined signal strength ratios as a function of position. The stored program processor 125 then uses the following formula to calculate the displacement from the remote receiver component 100 to the sensor 10:

$$Z_R=(½)(T_1-K)C \qquad \text{Equation 5}$$

where:

C=the radio wave speed,

K=the sensor circuit delay time, and $Z_R$=the displacement from the remote receiver component to the sensor.

In Equation 5, $T_1$ is the elapsed time measured by a timer in the clock circuit 135 between receipt of the query transmission indication signal 116 by the stored program processor 125 and receipt of the microwave signal 111*d* from the transmitting circuit and its antenna 18*d*.

The stored program processor 125 "reads" receiver 105*a* (step 205) and stores received signal strength value 112*a* in a memory location A (step 206). Then, stored program processor 125 "reads" receiver 105*b* (step 207) and stores received signal strength value 112*b* in a memory location B (step 208).

Figure 3B:
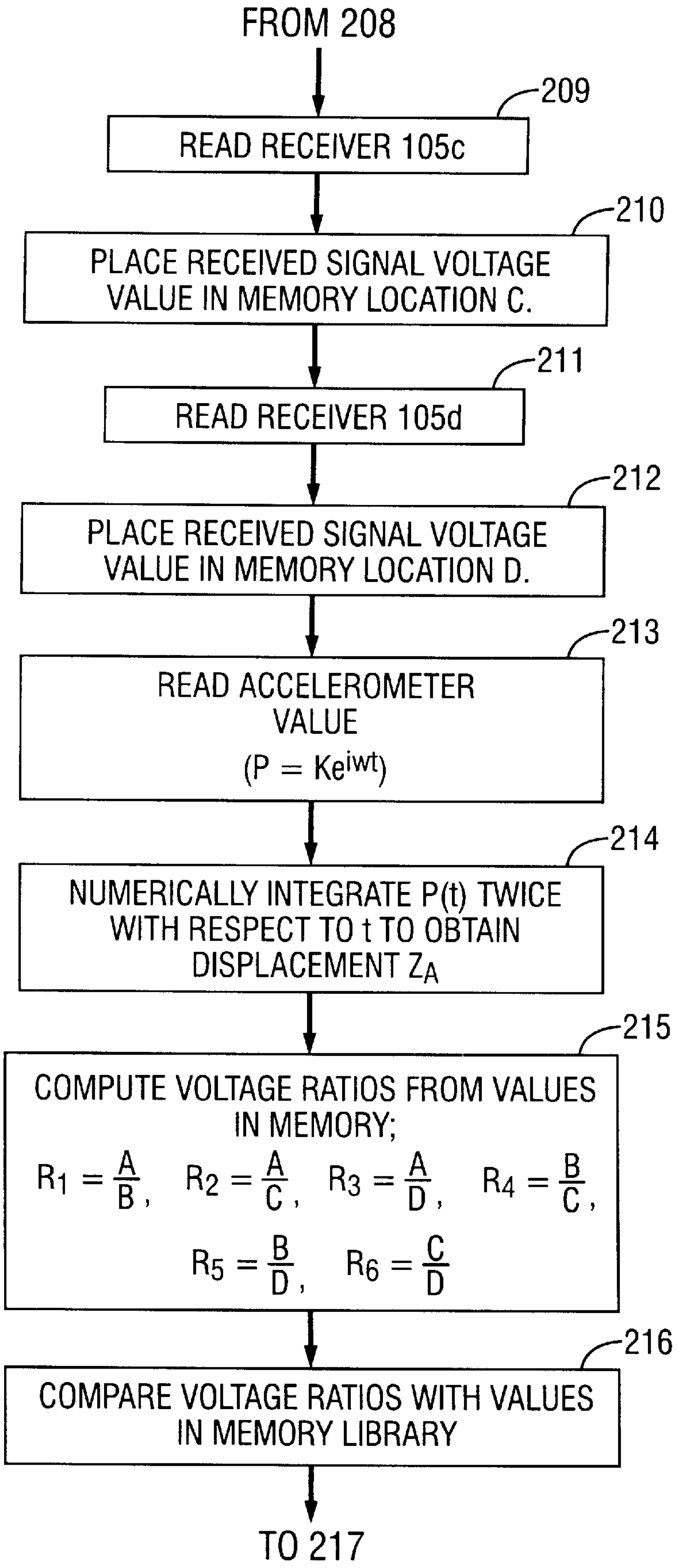

Referring now to FIG. 3B (steps 209–216), the stored program processor 125 next "reads" receiver 105*c* (step 209) and stores received signal strength value 112*c* in a memory location C (step 210). As illustrated in steps 211 and 212, stored program processor 125 then reads receiver 105*d* and stores received signal strength value 112*d* in a memory locationD. (As will be apparent to those skilled in the art, memory locations A, B, C and D must be appropriately initialized at the beginning of the process.)

Processor 125 "reads" accelerometer signal output line 14 to obtain an accelerometer value (step 213). The accelerometer value P is determined using the following phasor equation:

$$P=Ke^{i\omega t}$$

where:

K=amplitude

ω=frequency, and t=time.

Processor 125 calculates displacement $Z_a$ by twice integrating the accelerometer value with respect to time (step 214). That is, $$Z_a=\int\int Ke^{i\omega t}dt^2.$$

The processor 125 calculates six different ratios of the signal strength indication signals 112 stored in memory locations A, B, C and D (step 215), where ratio 1=value A/value B  Equation 6 ratio 2=value A/value C  Equation 7 ratio 3=value A/value D  Equation 8 ratio 4=value B/value C  Equation 9 ratio 5=value B/value D  Equation 10 ratio 6=value C/value D  Equation 11

Predetermined signal strength ratios which are predetermined functions of positions of the sensor 10 relative to the remote receiver component 100, are in the memory 130 of stored program processor 125. The processor 125 uses these values to calculate the angle of the sensor 10 relative to the original resting plane of the structure-under-test.

Each one of the six ratios is compared to the library of strength ratio values stored in the memory 130 (step 216).

Figure 3C:
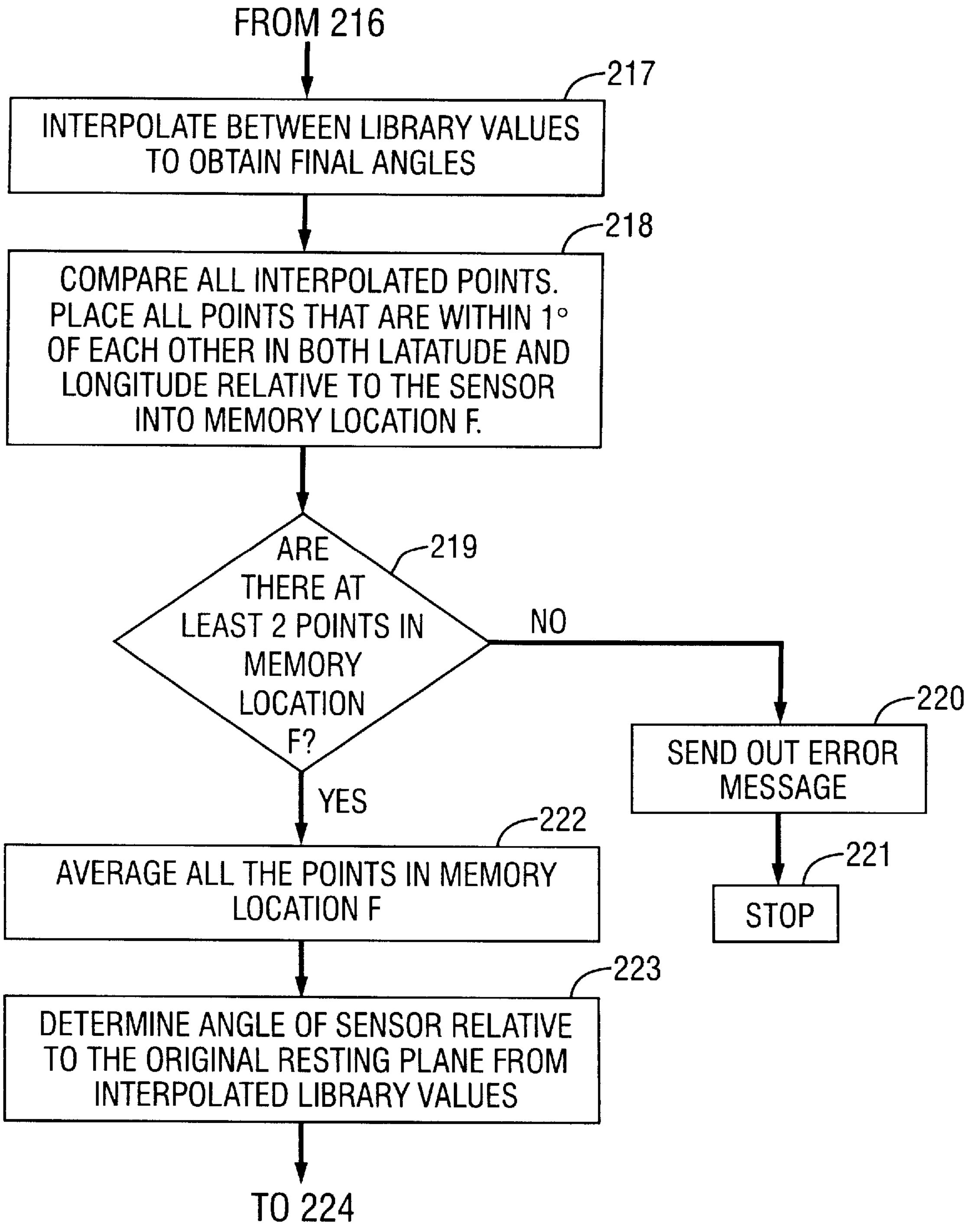

Referring now to FIG. 3C, steps 217–223, the processor 125 then calculates, for each ratio, final angles by interpolating between known points stored in the memory 130 (step 217).

The processor 125 compares all the interpolated positions resulting from step 217 and places into a memory location F (step 218) all positions that are within one degree of each other in both latitude and longitude relative to the sensor 10. These interpolated positions should be within one degree of each other because they define the position of the sensor 10 at a single instant in time. If after step 218, there are not at least two positions stored in the memory location F, then the processor sends out an error message and stops calculating (steps 219–221). On the other hand, if there are at least two positions stored in the memory location F, then the processor averages all the positions in memory location F and calculates the angle of the sensor 10 relative to the original ground plane of the structure-under-test (steps 219; and 222–223).

Figure 3D:
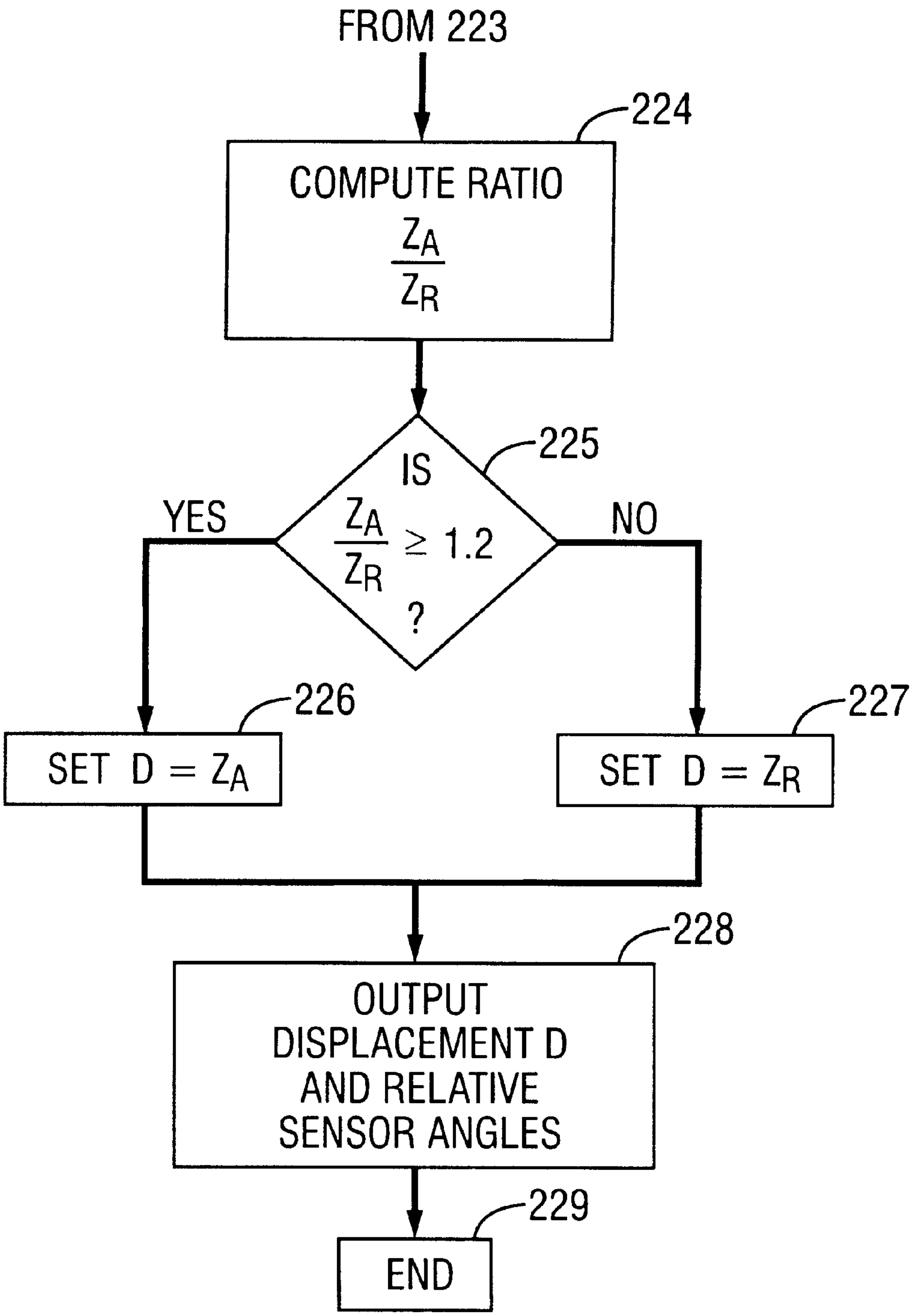

Referring now to FIG. 3D, steps 223–230, the processor 125 computes the ratio $Z_A/Z_R$ where $Z_A$=accelerometer displacement and $Z_R$=displacement from the remote receiver component 100 to the sensor 10 (step 224). Processor 125 compares this ratio to an empirically derived ratio that compares the accuracy of $Z_A$ to $Z_R$. In this preferred embodiment, the value of this ratio is 1.2. This means that if the accelerometer displacement, $Z_A$ is greater than 1.2 times the displacement from the remote receiver component 100 to the sensor 10, $Z_R$,the $Z_R$ is assumed to be incorrect due to an inability to accurately measure vibrations normal to the plane of the sensor 10 because such vibrations are too small. Hence, in this embodiment, if the ratio is greater than or equal to 1.2 (step 225), the processor 125 sets the displacement D, equal to $Z_A$; on the other hand, if the ratio is less than 1.2, the processor 125 sets the displacement, D, equal to $Z_R$ (step 227).

In another embodiment of the present invention, the sensor 10 includes additional antennas to reduce measuring error. In yet another embodiment, the measuring error is reduced by having the stored-program processor 125 measure the distance several times and average the results, and measure the bearing of the remote receiver component 100 from the sensor 10 several times and average the results.

In another embodiment of the present invention, the distance between the remote receiver component and sensor is calculated by the stored-program processor by measuring only the signal strengths, not the signal times. In that embodiment, the receiver 105*d* also transmits a signal strength indication signal 112*d*. For this embodiment, the stored-program processor 125 is programmed to calculate the distance between the remote receiver component 100 and sensor 10 using the inverse square rule:

$$p_f = p_t g_r g_f \left(\frac{2}{4\pi d^2}\right) \quad \text{Equation 12}$$

where: $p_r$=the power (in watts) received at the receivers 105, $p_t$=the power (in watts) of the antennas 18 at the sensor 10, $g_t$=the gain of the antenna 37, $g_r$=the gain of each antenna 110_a_–111_d_, λ=wavelength (in meters), and d=distance (in meters).

In another embodiment of this invention, the accelerometer 12 is not included.

In still yet another embodiment of the present invention, multiple microprocessors are used such that computations are performed in parallel.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed:

1. A system comprising:

a signal transmission component adapted to be positioned on a structure-under-test, said transmission component including:

a planar substrate;

a first microwave oscillator, monolithically formed on the substrate, having a first output, and operable to generate at the first output a first signal having a first frequency;

a second microwave oscillator, monolithically formed on the substrate, having a second output, and operable to generate at the second output a second signal having a second frequency;

a third microwave oscillator, monolithically formed on the substrate, having a third output, and operable to generate at the third output a third signal having a third frequency;

a first microstrip antenna, coupled to the output of the first microwave oscillator and responsive to the first microwave oscillator, and operable to transmit the first signal as a symmetrical directional signal having a first cross-section;

a second microstrip antenna, coupled to the output of the second microwave oscillator and responsive to the second microwave oscillator, and operable to transmit the second signal as a symmetrical directional signal having a second cross-section;

a third microstrip antenna, coupled to the output of the third microwave oscillator and responsive to the third microwave oscillator, and operable to transmit the third signal as a symmetrical directional signal having a third cross-section;

wherein the first, second, and third microstrip antennas are positioned on the substrate generally symmetrically about a reference point on the substrate, to transmit the first, second, and third signals in a generally common direction normal to the substrate at the reference point;

wherein the first, second, and third frequencies are different one from the other; and wherein the first, second, and third cross-sections are different one from the other; and a receiver component adapted to be positioned remote from the transmission component in a line-of-sight relation with the transmission component, said receiver component including:

a base;

a first receiver mounted on said base, and operable to detect the first signal, to determine a signal strength for the first signal, and to generate a first signal strength indication signal indicative of the signal strength for the first signal;

a second receiver mounted on said base, and operable to detect the second signal, to determine a signal strength for the second signal, and to generate a second signal strength indication signal indicative of the signal strength for the second signal; and a third receiver mounted on said base, and operable to detect the third signal, to determine a signal strength for the third signal, and to generate a third signal strength indication signal indicative of the signal strength for the third signal.

2. The system of claim 1 wherein the receiver component further comprises:

a query signal transmitter operable to generate a microwave signal to energize the first, second, and third microwave oscillators of the signal transmission component.

3. The system of claim 1 wherein the receiver component further comprises a stored program processor operable to receive the first, second, and third signal strength indication signals, and to calculate a position for each of the first, second, and third microwave oscillators relative to the receiver component.

4. The system of claim 1 wherein the signal transmission component further comprises a piezoresistive accelerometer positioned on the substrate, generally at the reference point.

5. A sensor comprising:

a substrate adapted to be secured to a structure-under-test;

n microwave oscillators monolithically formed on the substrate in a common plane, where n is at least three, each of said microwave oscillators having an output and being capable of generating at said output an unmodulated microwave signal having a particular frequency, wherein the particular frequency is different for each of the n microwave oscillators;

n microstrip antennas, each said microstrip antenna being coupled to the output of one of said n microwave oscillators and operable to transmit the unmodulated microwave signal generated by the microwave oscillator to which the microstrip antenna is coupled;

said n microstrip antennas being positioned on said substrate to transmit in a generally common direction; and an accelerometer positioned on the substrate to detect vibrations in a direction generally normal to the common plane.

6. The sensor of claim 5 wherein the accelerometer comprises a piezoresistive accelerometer.

7. A system comprising:

a signal transmission component adapted to be positioned on a structure-under-test, said transmission component including:

a planar substrate;

n microwave oscillators monolithically formed on the substrate, where n is at least three, each of said microwave oscillators having an output and being capable of generating a signal having a particular frequency, wherein the particular frequency is different for each of the n microwave oscillators;

a piezoresistive accelerometer positioned on said substrate generally central to said n microwave oscillators;

n microstrip antennas, each said microstrip antenna being mounted on the substrate and coupled to the output of one of said n microwave oscillators and operable to transmit the signal generated by the microwave oscillator to which the microstrip antenna is coupled, said n microstrip antennas being positioned on said substrate to transmit in a generally common direction; and n dielectric lenses, each said dielectric lens covering one of said n microstrip antennas and operable to shape the signal transmitted by the microstrip antenna covered by said dielectric lens to have a particular beam shape, wherein the particular beam shape is different for at least three of the n microstrip antennas; and a receiver component adapted to be positioned remote from the transmission component in a line-of-sight relation with the transmission component, said receiver component including:

a base; and n receivers mounted on said base, each said receiver being capable of detecting the signal transmitted by one of said n microstrip antennas, measuring the strength of the signal, and generating a voltage that is a function of the strength of the signal.

8. A system comprising:

a signal transmission component having:

a planar substrate;

n microwave oscillators monolithically formed on the substrate, where n is at least three, each said microwave oscillators having an output and being capable of generating a signal having a particular frequency, wherein the particular frequency is different for each of the n microwave oscillators;

n microstrip antennas, each said microstrip antennas being mounted on the substrate and coupled to the output of one of said n microwave oscillators and operable to transmit the signal generated by the microwave oscillator to which the microstrip antenna is coupled, said n microstrip antennas being positioned on said substrate to transmit in a generally common direction; and n dielectric lenses, each said dielectric lens covering one of said n microstrip antennas and operable to shape the signal transmitted by the microstrip antenna covered by said dielectric lens to have a particular beam shape, wherein the particular beam shape is different for at least three of the n microstrip antennas; and a receiver component having:

a query signal transmitter for generating a query signal and for energizing at least one of said n microwave oscillators with said query signal;

a base;

n receivers, each of said n receivers operable to receive the signal transmitted by one of said n microstrip antennas and to generate a signal strength indication signal; and a stored program processor for receiving said query signal and the signal strength indication signal of each of said n receivers, and operable to calculate a position for each of said n microwave oscillators relative to the receiver component, using predetermined signal strength ratios.

9. The system of claim 8 wherein each receiver is tuned to a receiver frequency equal to the particular frequency of one of the n microwave oscillators, wherein the receiver frequency is different for each of the n receivers.

10. The system of claim 8 wherein the signal strength indication signal of each receiver comprises a signal strength indication signal value representative of a position unique to one of the n microwave oscillators.

11. The system of claim 8 wherein the predetermined signal strength ratios are stored in the stored program processor's memory, and wherein the stored program processor is operable to determine modal properties of a structure under test.

* * * * *